United States Patent [19]

Brown et al.

[11] 3,715,785

[45] Feb. 13, 1973

[54] TECHNIQUE FOR FABRICATING INTEGRATED INCANDESCENT DISPLAYS

[75] Inventors: Alan V. Brown; Frederick Hochberg, both of Yorktown Heights, N.Y.

[73] Assignee: International Business Machines Corporation, Armonk, N.Y.

[22] Filed: April 29, 1971

[21] Appl. No.: 138,409

[52] U.S. Cl...............................29/25.11, 313/109.5

[51] Int. Cl...............................H01j 9/00

[58] Field of Search .......313/109.5; 29/25.13, 25.14, 29/25.15, 25.16, 25.18, 424, 625, 604, 25.11; 316/17, 23

[56] References Cited

UNITED STATES PATENTS

| | | | |
|---|---|---|---|
| 3,583,066 | 6/1971 | Carbonel | 29/604 |
| 3,408,523 | 10/1968 | Demarest et al. | 313/109.5 |

*Primary Examiner*—Charles W. Lanham
*Assistant Examiner*—James W. Davie
*Attorney*—Hanifin and Jancin and John A. Jordan

[57] ABSTRACT

Incandescent "microfilaments" for integrated display devices, and the like, are batch fabricated using planar technologies. The planar incandescent filaments are made of thin films, suspended to minimize heat conduction losses. Heat losses are additionally minimized by appropriately shaping the ends of the filaments. By utilizing planar technologies all filaments of a display device may be fabricated en masse in a single plane and, individual filaments may be etched to various shapes and curves thereby obviating the problems encountered where elements must be strung between support posts, in a straight line. Typically, a ceramic substrate is first coated with a layer of reflecting material and etched, if desired, to the pattern selected for the reflecting surface. Thereafter, a support material, such as glass, is deposited over the substrate and reflecting material. Holes are then drilled into the glass and substrate and filled with conductive material, to thereby form support posts. A filament material, such as tungsten, is then deposited over the support layer so as to make conductive contact with the underlying support posts. By using conventional etching techniques a filament of desired pattern is then formed between the posts. Thereafter the support layer may be etched away leaving the filament suspended between the posts.

24 Claims, 23 Drawing Figures

INVENTORS
ALAN V. BROWN
FREDERICK HOCHBERG

BY John A. Jordan
ATTORNEY

TECHNIQUE FOR FABRICATING INTEGRATED INCANDESCENT DISPLAYS

BACKGROUND OF THE INVENTION

The present invention relates to incandescent illumination and display apparatus, and processes for making same. More particularly, the present invention relates to improved incandescent filament arrangements and, processes for fabricating such filament arrangements, particularly as pertains, for example, to incandescent display devices. In accordance with the principles of the present invention planar fabrication techniques are employed to make improved incandescent elements of a planar "microfilament" variety, which "microfilaments" may readily be utilized in integrated incandescent illumination and display apparatus.

Heretofore, the filaments of incandescent display cells and illumination apparatus have typically been fabricated by individually wiring each filament, of whatever type, to appropriate support posts. One of the difficulties with such an approach, it can be seen, resides in the fact that it is highly time-consuming and expensive. In addition, such an approach clearly imposes a restraint upon the size and shape of the filament that may, practically, be fabricated. One commonly used prior art display apparatus, for example, is manufactured by employing, as individual incandescent filaments, coiled wire, bonded to posts. It is evident, from such an arrangement that the required bonding process is cumbersome and costly and the fabricated device is limited in size, shape and efficiency.

Not only is the "coiled wire" filament approach difficult to fabricate but, in addition, the "coiled wire" approach, with filament bonded between support posts, necessarily requires the individual filaments to be stretched in a straight-line. Accordingly, individual filament elements cannot be selectively configured to individual shapes. Not only are the individual filament elements constricted to a straight-line shape but, in addition, when the elements are arranged in a display device, elaborate arrangements must be made to allow the filaments to overlap at the terminals thereof in order to minimize gaps in the configured symbols. This is necessitated, in part at least, by the fact that end losses, i.e., conduction losses at the filament terminals, prevents the individual filaments from effectively illuminating the full length of the filament wire line. Accordingly, when alphanumeric characters, for example, are made by the selective illumination of individual filaments, the individual filaments are arranged to overlap at the terminals thereof so that illumination is present the full length of the line segments of the alphanumeric character, such that the character looks relatively continuous. Exemplary of such an arrangement is that described more particularly by P. C. Demarest et al in U. S. Pat. No. 3,408,523, issued Oct. 29, 1968.

It can be seen that in the "coiled wire" approach to the fabrication of incandescent filaments, such as that described by Demarest et al, cumbersome and complex manufacturing procedures are necessarily encountered. In addition, it can be seen that display devices fabricated in accordance with such an approach necessarily are thick, bulky and inefficient, in that the necessity of overlapping the filaments requires the filaments to be arranged in different planes. Reduction of thickness obviously involves critical tolerances and difficult packaging problems which significantly effect reliability.

It is therefor, accordingly, an object of the present invention to provide an improved process for the manufacture of incandescent filaments.

It is a further object of the present invention to provide an improved incandescent display device, and improved filament therefor.

It is still a further object of the present invention to provide an improved incandescent filament for use as an illumination device in display cells, and the like.

It is yet a further object of the present invention to provide an improved alphanumeric display apparatus.

It is yet still a further object of the present invention to provide a highly effective process for fabricating integrated incandescent display apparatus.

It is another object of the present invention to provide a process for fabricating incandescent display devices where all the filaments of each device are in a single plane and wherein each of the devices may be shaped to any of a variety of selected configurations.

It is still another object of the present invention to provide an incandescent display device that may be fabricated without the need for mechanical assembly.

It is yet still another object of the present invention to provide an improved incandescent display device whereby the incandescent filaments glow at lower temperatures than heretofor achieved thereby increasing the lifetime of the filaments. This is accomplished because the planar filament, in accordance with the present invention, provides a greater radiating surface area within the character size employed.

It is yet another object of the present invention to provide an improved display device and incandescent filament therefor that may be manufactured economically and which exhibits high reliability and improved performance.

Although planar fabrication techniques have, in the past, been applied to a variety of integrated circuit and semiconductor device construction processes, such techniques have not heretofore been employed in the fabrication of incandescent filaments, as taught in accordance with the principles of the present invention.

Typical of the prior art problems confronted with the planar technology is that involving crossovers in integrated circuits. Exemplary of the manner in which the latter problem is confronted is that given by Lepselter in the Bell Laboratories Record, in the article entitled "New Gold Crossovers Interconnect Integrated Circuits," February 1968.

In accordance with the principles of the present invention there is provided a process for either the individual or batch fabrication of incandescent "-microfilaments," using planar technology, whereby display devices, and the like, may readily be constructed, en masse without mechanical assembly, in a manner so that all the filaments are in a single plane. The resultant display device so fabricated is economical in construction costs, simple, reliable and efficient, exhibiting individual incandescent elements which may be shaped to any of a variety of desired configurations and which operate at reduced average illumination temperatures.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 3A–3F depict a series of steps exemplary of those that may be employed to fabricate a channel-type filament form, in accordance with the principles of the present invention.

FIGS. 4A–4D depict a series of steps akin to those described in FIGS. 1A–1J, wherein a channeled substrate is filled to provide a temporary support and thereafter emptied to leave a free standing filament to bridge the channel.

DETAILED DESCRIPTION OF THE DRAWINGS

FIGS. 1A–1J show a series of steps exemplary of those that may be employed in carrying out the preferred mode, in accordance with the principles of the present invention. These steps depict the significant techniques and features used in carrying out a process to fabricate a "microfilament" typified by the filament configuration, shown in perspective in FIG. 2.

Figures 1A, 1B, 1C, 1D, 1E, 1F, 1G, 1H, 1I, 1J:
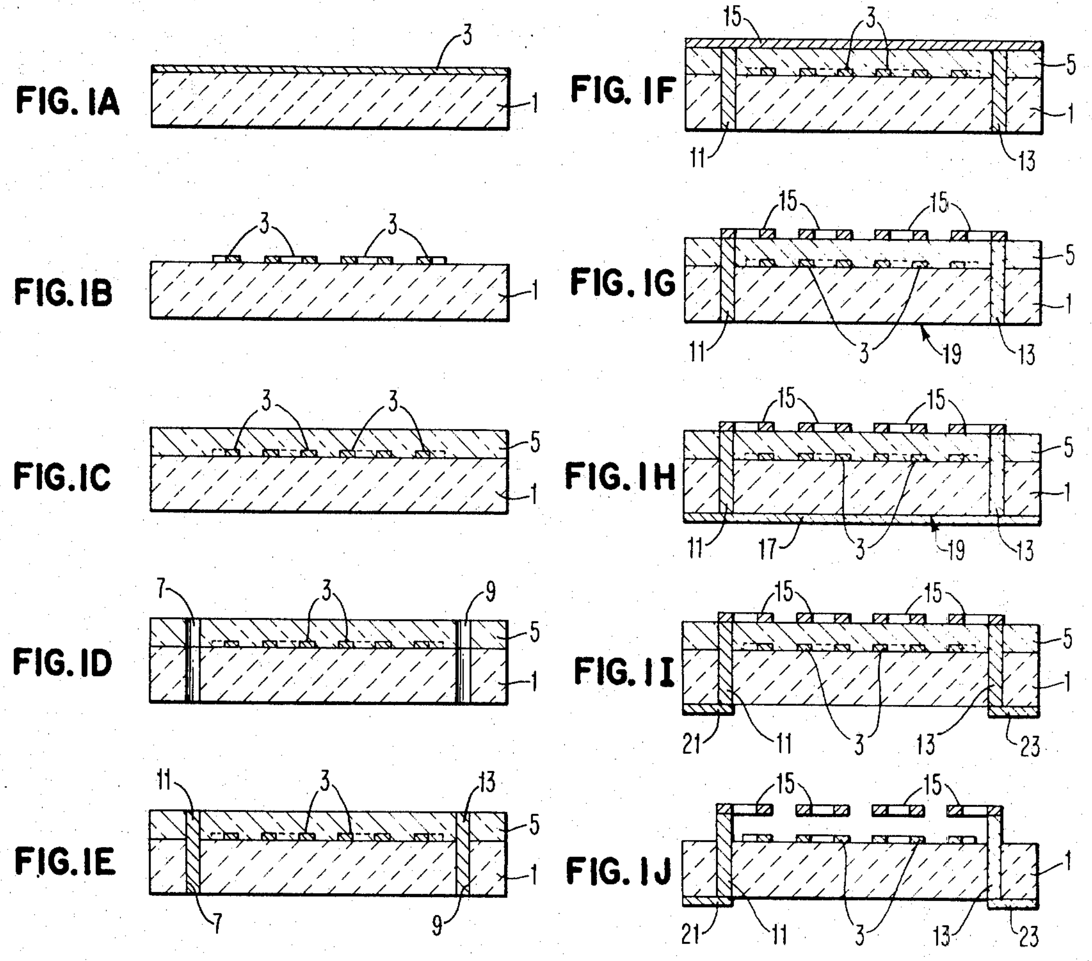
FIGS. 1A–1J depict a series of steps, exemplary of those that may be employed in carrying out the process, in accordance with the principles of the present invention.

As shown in the step represented by FIG. 1A, a substrate 1 of ceramic material, for example, is first coated with a layer 3 of reflective material. In this regard it should be noted that substrate 1 may be any of a variety of supports upon which a reflective material, such as metal, may be deposited. The layer 3 is to be used as a reflecting surface for the ultimate incandescent filament to be fabricated. It should be noted, also, that layer 3 may be deposited by any of a variety of conventional techniques, such as vapor deposition or sputtering. Thereafter, layer 3, which may in the typical preferred mode be chromium or tungsten, is etched to the configuration desired for this purpose. As shown by the step of FIG. 1B, this etched configuration may take a form akin to that of the incandescent filament, to ultimately be fabricated. This can be seen more clearly by reference to FIG. 2 wherein the configuration of reflector 3 is shown to be the same as incandescent filament 15, thereabove.

After the etching of reflective layer 3, as shown in FIG. 1B, a support layer 5 is deposited thereover, as shown in FIG. 1C thereof. The function of layer 5 is to support the subsequently applied layer of incandescent material, to be fabricated into a filament. Typically, layer 5 may be glass, such as Corning 7070 glass. It should be noted here that although the process steps described with respect to FIGS. 1A–1J depict a single incandescent filament, it is clear that these steps are merely illustrative of the key steps, in accordance with the principles of the present invention, and that these steps are likewise applicable to the simultaneous fabrication of any number of incandescent filaments. Thus, the variously described deposition and etching steps could obviously operate to effect contemporaneous fabrication of any number of variously formed filaments. In fact, it is a very significant aspect of the present invention that a display cell, employing incandescent filaments, can be fabricated en masse.

After support layer 5, which as hereinabove indicated may be glass, is deposited upon substrate 1 with its configured reflective layer 3, as shown in FIG. 1C, holes are drilled through the glass layer and substrate, as shown in FIG. 1D. These holes may be formed by any of the variety of techniques. For example, an electron beam drilling technique may readily be used. Alternatively, the holes may be machined by mechanical drilling. The holes, as shown at 7 and 9 in FIG. 1D, are then filled with a conductive material to thereby form posts, as shown at 11 and 13, in FIG. 1E. In this regard, the holes may be filled to form posts by an electroplating process, whereby the holes become plated with copper, for example. It is clear that any of a variety of metals may be employed to fabricate the posts 11 and 13, as shown in FIG. 1E. The main requirements for these posts are that they are of sufficient strength to support the ultimate incandescent filament, to be suspended therebetween, and they they are conductive.

After conductive support posts 11 and 13 have been fabricated, as shown in FIG. 1E, a layer of incandescent material 15 is then deposited upon the layer of glass 5 and into conductive contact with the support posts, as shown in FIG. 1F. Incandescent material 15 may be any of a variety of well known incandescent materials. In the typical preferred embodiment, incandescent layer 15 may be made of tungsten. The incandescent layer may, it is clear, likewise, be deposited by any of a variety of well known techniques. For example, layer 15 may be deposited by any one of E-gun evaporation techniques, sputtering techniques or CVD (chemical vapor deposition) techniques. A particular manner in which selective CVD techniques may be employed to fabricate layer 15 of tungsten will be described hereinafter with respect to FIG. 3.

Figure 2:
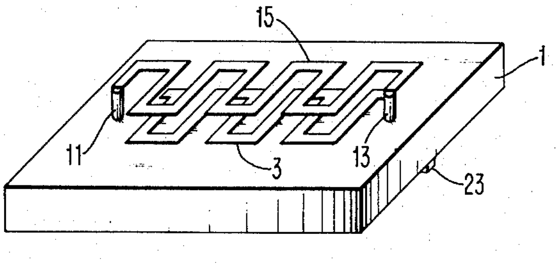
FIG. 2 depicts a perspective view of a typical incandescent filament configuration produced employing the process, in accordance with the principles of the present invention.
Figure 3A:
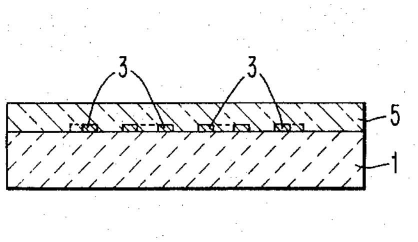
Figure 3A:
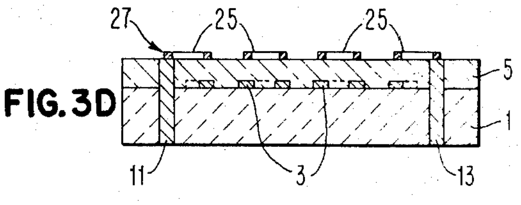
Figure 3B:
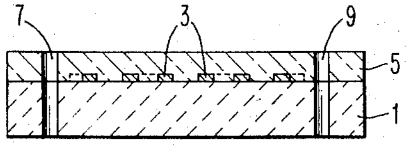
Figure 3B:
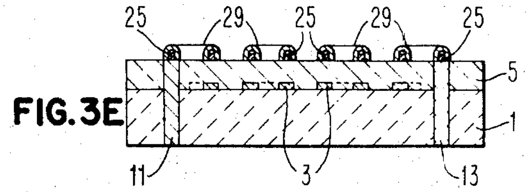
Figure 3C:
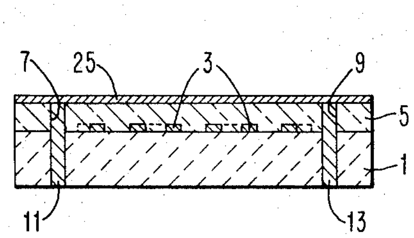
Figure 3C:
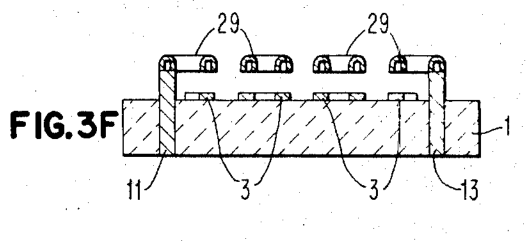

After incandescent material layer 15 has been deposited upon support layer 5, it is etched to provide the desired filament configuration, as shown in FIG. 1G. As hereinabove indicated, FIG. 2 shows one possible filament configuration. It should be noted, that any of a variety of etching techniques may be employed to etch incandescent layer 15 to the desired configuration. For example, conventional photo-resist and chemical etching techniques may readily be employed to appropriately etch layer 15. It is clear that utilization of photo-resist techniques allows the fabrication of very minute and intricate filament patterns. The significance of employing photo-etch techniques will become more clear hereinafter when it is recognized that very minute individual filaments are thereby allowed to be fabricated in a matrix array scheme, otherwise not capable of being fabricated using conventional mechanical fabrication techniques. It should, likewise, be noted that these conventional photo-etch techniques may also be employed to etch the pattern desired in reflective layer 3.

After the incandescent filament has been etched, in accordance with the step of FIG. 1G, a layer of conductive material 17 may then be deposited upon the opposing surface 19 of substrate 1, and into conductive contact with support posts 11 and 13, as shown in FIG. 1H. Thereafter, conductive layer 17 is etched so that all that remains is a pair of electrical contacts 21 and 23 in respective conductive relationship with posts 11 and 13, as shown in FIG. 1I. These contacts may be in the form of conductive tabs or wire lines. Layer 17 may be any of a variety of conductive materials, such as copper. After conductive layer 17 has been etched to form electrical contacts 21 and 23, as shown in FIG. 1I, then, support layer 5 is removed as shown in FIG. 1J. It is clear that support layer 5 may readily be removed by using processes such as chemical etching, or any of a variety of other material removal processes.

FIG. 2 shows a perspective view of a typical incandescent filament configuration, fabricated in accordance with the principles of the present invention. It is clear from FIG. 2 that substrate 1 may be any of a variety of ceramic materials, as indicated with respect to the description in regard to the steps of FIG. 1. Likewise, filament 15 may be fabricated from any of a variety of incandescent materials. It should be recognized that the arrangement shown in FIG. 2 is merely illustrative of an arrangement that might be fabricated, in accordance with the principles of the present invention. Thus, in this regard, filament 15 may take any of a variety of configurations. Likewise, substrate 1 may be of any reasonable size and may support as many filaments as this size will reasonably accomodate. With respect to the fabrication of multiple filaments on a substrate to create, for example, a display cell or the like, it should be recognized that the essentials of the steps enumerated in FIGS. 1A–1J remain the same for such fabrication, as they do for the fabrication of the basic filament shown therein. In particular, the various steps of depositing, etching, removing and the like, remain substantially the same whether a single filament is being fabricated or multiple filaments are being fabricated. Thus, it is clear that a display cell may readily be created en masse, using the techniques in accordance with the present invention.

In FIGS. 3A–3F there is shown a series of steps which may be employed as an alternative to several of the steps shown in FIGS. 1A–1J. It should be recognized in this regard that the steps shown in FIGS. 1A–1J produce an incandescent filament which is somewhat serpentine in shape in its planar dimension. Typically, filament 15 in FIG. 2 may be of the order of 12 microns wide and 1 micron thick while being suspended 5 mils above substrate 1. It is clear that smaller widths and thicknesses may be fabricated. However, it is likewise clear that the rigidity of the filament becomes a factor in any practical arrangement. In this latter regard, the steps depicted in FIGS. 3A–3F illustrate a process that may be employed to make the filament channel-shaped to thereby increase its rigidity.

The initial prepatory steps required in the process depicted in FIGS. 3A–3F are akin to those of the process depicted in FIGS. 1A–1J. Accordingly, it can be seen that FIG. 3A corresponds to FIG. 1C, and is arrived at by the same antecedent steps, as in FIGS. 1A and 1B. Likewise, it can be seen that FIG. 3B corresponds to FIG. 1D. However, after the holes 7 and 9 have been filled so as to create posts 11 and 13, rather than deposit a layer of incandescent material, as shown in FIG. 1F, a layer of material, which is selectively responsive to the chemical vapor deposition of the incandescent material to be employed, is thereafter deposited. This selective material is shown as layer 25 in FIG. 3C, and may comprise any of a variety of materials which will act to nucleate the vapor of the incandescent material to be deposited. Thus, where tungsten, for example, is to be employed as the incandesant material and 7070 glass is employed as the support layer 5, then, layer 25 may be copper, since copper will nucleate the tungsten vapor while the 7070 glass will act to oblate the tungsten vapor.

After layer 25, which for purposes of illustration and example may be taken as copper, is deposited on support layer 5, which may be taken as 7070 glass, the layer of copper, which is to act somewhat as a mold, is etched to the configuration desired for the ultimate filament to be fabricated. As shown in FIG. 3D, copper layer 25 is etched to form a copper mold exhibiting a pattern akin to the somewhat serpentine pattern exhibited by element 15 in FIG. 2. It is clear that this mold pattern must necessarily be somewhat smaller than the size of the ultimate incandescent filament to be built-up thereon. It can be seen, with respect to FIG. 3D, that the copper mold pattern exhibits a cross-section 27 which is smaller than the cross-section of posts 11 and 13, and which is centrally positioned upon the respective posts.

After copper layer 25 has been etched to form a mold, the selective chemical vapor deposition step is then carried out. Accordingly, the arrangement shown in FIG. 3D is inserted into a chemical vapor deposition chamber whereby it is exposed to a tungsten vapor. In accordance with such a process the tungsten vapor selectively deposits upon the copper since the surface of the 7070 glass layer 5 acts to oblate the tungsten vapor, thereby preventing any significant build-up of tungsten thereon. After the desired thickness of tungsten has been deposited upon the copper, so as to form an incandescent filament 29, the chemical vapor deposition step is terminated and the device is removed from the chamber. Thereafter, the 7070 glass layer 5 and copper are removed by etching, leaving, in the same manner as described with respect to the process of FIGS. 1A–1J, the incandescent filament suspended between posts 11 and 13, as shown in FIG. 3F. However, it can be seen that the resultant incandescent filament 29 is channel-shaped and, accordingly, will thereby exhibit added rigidity.

Figure 4A:
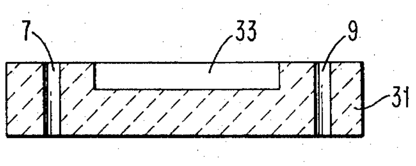
Figure 4A:
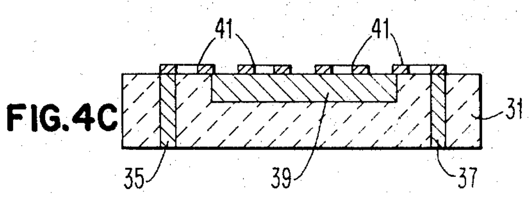
Figure 4B:
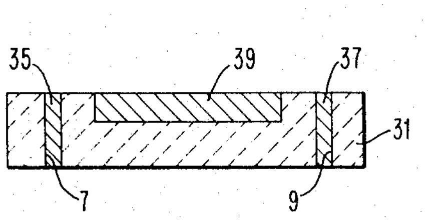
Figure 4B:
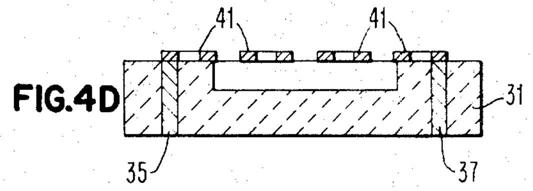

In FIGS. 4A–4D there is depicted a series of steps representing a further alternative scheme for fabricating incandescent filaments to that depicted in FIGS. 1A–1J. In the arrangement of FIG. 4, rather than employ a temporary support layer, as was done in the previously described processes, a ceramic substrate 31 with a channel 33 may be employed. Channel 33 may be formed by any of a variety of conventional material removal techniques, such as, etching. As in the previously described processes, a pair of holes 7 and 9 are formed in the substrate, as shown in FIG. 4A. Thereafter, the holes are filled with conductive material, as previously described, to create a pair of conductive posts 35 and 37. However, as can be seen from the configuration of the substrate, these posts are not required to act as sole support for the incandescent filament to be subsequently fabricated. Channel 33 is also filled with a material, which is to act as a temporary support. This material may be any of a variety of materials capable of being selectively reremoved thereafter by any of a variety of techniques, such as, chemical etching. Thus, channel 33 may be filled with a ceramic material, for example, or glass, or metal. Typically, channel 33 may be filled with a metal such as copper, as depicted by 39 in FIG. 4B.

After channel 33 has been filled, a layer of incandescent material is then deposited and thereafter etched to form the incandescent filament, as described in the previous processes. This is shown in FIG. 4C where incandescent filament 41 is shown exhibiting a shape akin to that described in regard to FIGS. 1A–1J and FIG. 2. After filament 41 has been etched the body of copper 39 in channel 33 may then be removed thereby leaving incandescent filament 41 bridged across the banks of the channel and in conductive contact with posts 35 and 37. It should be recognized that where support layer 5 in FIGS. 1A–1J and the support body 39 in FIG. 4 are made of insulative material, it is not absolutely necessary that they be removed. However, it is clear that the incandescent filament under such circumstances would operate at unnecessarily high power levels. Accordingly, the better mode is to suspend a substantial portion of the incandescent filament in free space whereby heat dissipation may be minimized.

Figure 5:
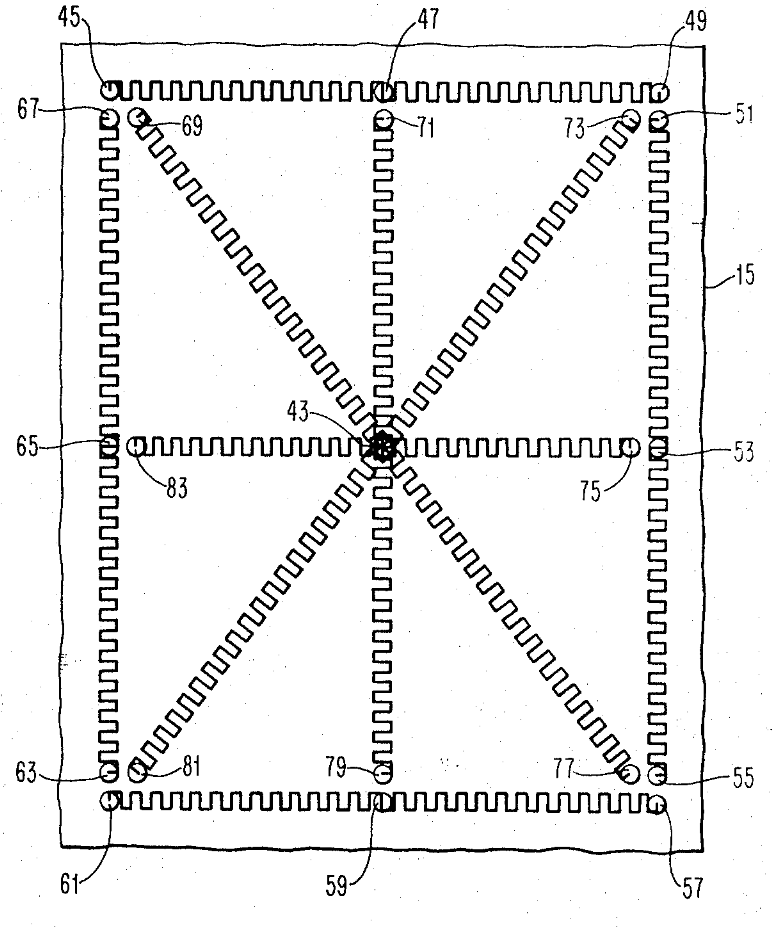
FIG. 5 shows a typical 16-segment alphanumeric display cell fabricated en masse in a single process, in accordance with the principles of the present invention.

In FIG. 5 there is depicted a conventional 16-segment alphanumeric display cell exhibiting incandescent filaments fabricated in accordance with the principles of the present invention. As can be seen, each segment exhibits a zig-zag or somewhat serpentine configuration, akin to that previously described. It is clear, however, that any of the variety of segment configurations may be employed. The manner of fabricating the 16 segment cell arrangement of FIG. 5 is the same as that described, for example, in regard to the process of FIGS. 1A–1J. However, as is evident, rather than directing the process steps toward the fabrication of a single element, the process steps are to be directed toward fabricating arrays of segments, en masse. Typically, the cell arrangement of FIG. 5 would measure 150 mils high and 100 mils wide. Thus, in fabricating an arrangement as shown in FIG. 5, a ceramic substrate 15 slightly in excess of the dimensions for an array of cells (alphanumeric characters) would initially be chosen. Thereafter a temporary support layer could be deposited thereupon (not shown) and holes, at appropriate locations, thereafter drilled therethrough. Thus, holes would be drilled by electron-beam for example, to allow fabrication of posts 43 through 83, as depicted in FIG. 5. After drilling, the holes would be filled and a layer of tungsten, for example, deposited over the entire surface of the support layer, as in previously described FIGS. 1A–1J. Then, the various filaments, as depicted in FIG. 5, would be configured by using photo-etch techniques and the support layer thereafter removed. It can be seen that for purposes of illustration the cross-section of the various posts is substantially larger than that of the filaments shown.

A 16-segment alphanumeric cell, akin to that depicted in FIG. 5, utilizing a tungsten filament with dimensions of the order of 12 microns wide and 1 micron thick, suspended 5 mils above the substrate by support posts approximately 100 mils apart, typically operates at a temperature of 1200° C. Such operating temperatures provide long-life filaments.

Figure 6:
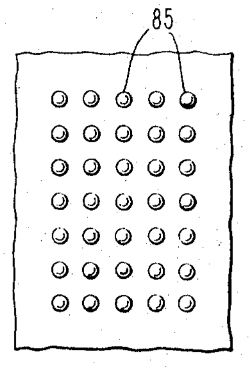
FIG. 6 shows an exemplary 5 × 7 matrix array of incandescent filaments fabricated en masse, in accordance with the principles of the present invention.

In FIG. 6 there is further depicted another example of an incandescent display cell, fabricated in accordance with the principles of the present invention. As can be seen, FIG. 6 provides an array of individual incandescent filament units 85. The individual filaments, which may be any planar shape, are selectively addressable whereby selected alphanumeric characters may be created. Typically, the alphanumeric matrix display of FIG. 6 may be a 5 × 7 arrangement, measuring, for example, 150 mils high and 100 mils wide with each incandescent unit located 0.025 mils on center. It is clear that with the above proportions the individual filaments of each unit may be of the order of 0.015 mils, for example.

It is clear that an incandescent display device comprising a matrix array of individual incandescent filaments, of the variety and dimensions given above, is not capable of practically being fabricated by conventional assembly techniques. However, by employing the planar etching techniques of the present invention, such a display cell may readily be fabricated en masse.

It should be recognized that although the zig-zag or substantially serpentine configuration of the planar incandescent filament described is only one of any of a variety of configurations that may be fabricated in accordance with the present invention, this particular configuration represents a compromise between the strength required to span a post-to-post distance of up to 100 mils and the electrical driving impedance characteristic required to match that of the standard logic circuitry employed in the display driving apparatus. In addition, this configuration provides an efficient and visually pleasing source of illumination. In this regard it should be noted that since relatively small support posts may be fabricated by the present invention, conduction losses at the ends of the filaments are minimized. To improve this even further it should be recognized that the filaments may be fabricated to taper as they approach the posts. Thus, end losses are substantially reduced.

It has, likewise, been found that tungsten filaments made in the manner of the process described with respect to FIGS. 1A–1J, exhibit a slight bow upwardly from the surface of substrate 1, as shown in FIG. 2, after the temporary support layer 5 has been removed. This can be seen to be clearly advantageous when it is recognized that upon energizing the filament, the filament expands in response to the heat generated. Accordingly, the slight upward bow assures that the filament, upon expansion, will move away from the surface of substrate 1, thereby avoiding possible contact therewith. In this regard, then, it should be noted that this slight upwardly extending bow may be introduced into the process by selecting a material for the temporary support layer which has a coefficient of thermal expansion significantly less than that of the substrate, such that the combined layers will bow upwardly at the center thereof upon cooling, after deposition of the support layer.

While the invention has been particularly shown and described with reference to preferred embodiments thereof, it will be understood by those skilled in the art that various changes in form and details may be made therein without departing from the spirit and scope of the invention.

We claim:

1. A process for fabricating incandescent filaments comprising the steps of:

forming a support layer on at least a portion of a surface of an insulative substrate;

forming holes at locations such that at least a portion of said support layer is positioned between selected pairs of holes;

forming conductive posts in said holes;

forming a layer of incandescent material on said support layer and said conductive posts;

etching said layer of incandescent material so as to form relatively flat incandescent filaments which continuously extend between pairs of said posts; and removing said support layer to leave said filaments supported at the ends thereof and in conductive relationship with said posts.

2. The process as set forth in claim 1 wherein said support layer is oblative to a vapor of the incandescent material used and said incandescent filaments are formed by first forming a pattern of material, which will nucleate the vapor of said incandescent material, between said pairs of posts and thereafter depositing the vapor of said incandescent material thereon so that said incandescent filament forms upon said pattern of nucleating material.

3. The process as set forth in claim 2 wherein said incandescent material is tungsten, said pattern of nucleating material is copper and said support layer is 7070 glass.

4. The process as set forth in claim 2 wherein said step of removing said support layer includes the step of removing said pattern of nucleating material.

5. The process as set forth in claim 1 wherein said incandescent filament is formed so as to exhibit a generally serpentine configuration between said posts.

6. The process as set forth in claim 5 wherein said incandescent filament is tungsten.

7. A method of fabricating an incandescent filament comprising the steps of:

forming holes through a ceramic substrate layer;

filling each of said holes with a conductive material to form conductive posts;

covering at least a portion of a surface of said ceramic substrate between said posts with temporary support material;

depositing a layer of incandescent material over at least a portion of the surface of said temporary support material and into contact with said conductive posts;

etching said layer of incandescent material so as to form an incandescent filament pattern extending between said conductive posts; and thereafter removing said temporary support layer.

8. The method as set forth in claim 7 wherein said incandescent material is etched using photo-etching techniques.

9. The method as set forth in claim 8 wherein said incandescent material is etched to form a filament of substantially serpentine configuration.

10. The method as set forth in claim 8 wherein said incandescent material is tungsten.

11. The method as set forth in claim 10 wherein said ceramic substrate layer is aluminum oxide.

12. The method as set forth in claim 11 wherein said temporary support material is a layer of glass.

13. The method as set forth in claim 12 wherein prior to depositing said temporary support material a layer of reflective material is deposited upon said substrate.

14. The method as set forth in claim 13 wherein said support material is 7070 glass and said tungsten is deposited by selective chemical vapor deposition upon a pattern of copper configured to the pattern desired for the incandescent filament.

15. A process for fabricating incandescent filaments, comprising the steps of:

forming a support layer on at least a portion of a surface of a substrate;

forming holes at locations such that at least a portion of said support layer is positioned between said holes;

forming conductive posts in said holes;

forming a layer of incandescent material thereon so that said incandescent material continuously extends between and into conductive contact with said posts; and etching said layer of incandescent material to form a configured incandescent filament between said posts.

16. The process as set forth in claim 15 wherein said incandescent material is etched using photo-etching techniques.

17. The process as set forth in claim 16 wherein said incandescent material is tungsten.

18. The process as set forth in claim 15 wherein said support layer is removed after the step of etching said layer of incandescent material.

19. The process as set forth in claim 17 further comprising the steps of:

forming upon the surface of said substrate and the ends of said conductive posts, opposite to that upon which said incandescent filament is formed, a layer of conductive material; and etching said conductive material so that conductive lines extend from said conductive posts.

20. A process for fabricating an incandescent display device having a plurality of selectively energizable incandescent filaments comprising the steps of:

forming a temporary support layer over at least a part of a layer of insulative substrate material;

forming holes through the said layer of insulative substrate with temporary support layer;

filling said holes with a conductive material to form conductive posts;

depositing a layer of incandescent material upon said temporary support layer and into conductive contact with said posts;

etching said layer of incandescent material so as to form configured incandescent filament patterns between respective pairs of said posts; and removing said temporary support layer so that said configured incandescent filament patterns bridge said pairs of posts.

21. The process as set forth in claim 20 wherein said layer of incandescent material is deposited by vapor deposition or sputtering techniques so that said layer of incandescent material is integral with said posts.

22. The process as set forth in claim 20 wherein said temporary support layer is formed over substantially the entire surface of said layer of substrate and said holes are formed through both said temporary support layer and said layer of substrate.

23. The process as set forth in claim 20 wherein said substrate has channels formed therein and said temporary support layer is formed to fill each of said channels whereby upon the removal of said temporary support layer from said channels said configured incandescent filament patterns bridge said channels.

24. A process for fabricating an integrated incandescent display device having a plurality of incandescent filaments comprising the steps of:

forming a layer of reflective material on at least a portion of an insulative substrate;

depositing a temporary support layer on said insulative substrate with reflective material;

forming holes through said temporary support layer and insulative substrate;

filling said holes with a conductive material to form conductive posts;

depositing a layer of incandescent material on said temporary support layer and into conductive contact with said posts;

etching said layer of incandescent material so as to form configured incandescent filaments between respective pairs of said posts;

removing said temporary support layer beneath said configured filaments.

* * * * *